June 22, 1937.  W. F. HOUGHTON  2,084,342
TREATMENT OF HYDROCARBON OILS
Filed May 25, 1933
Fig.1
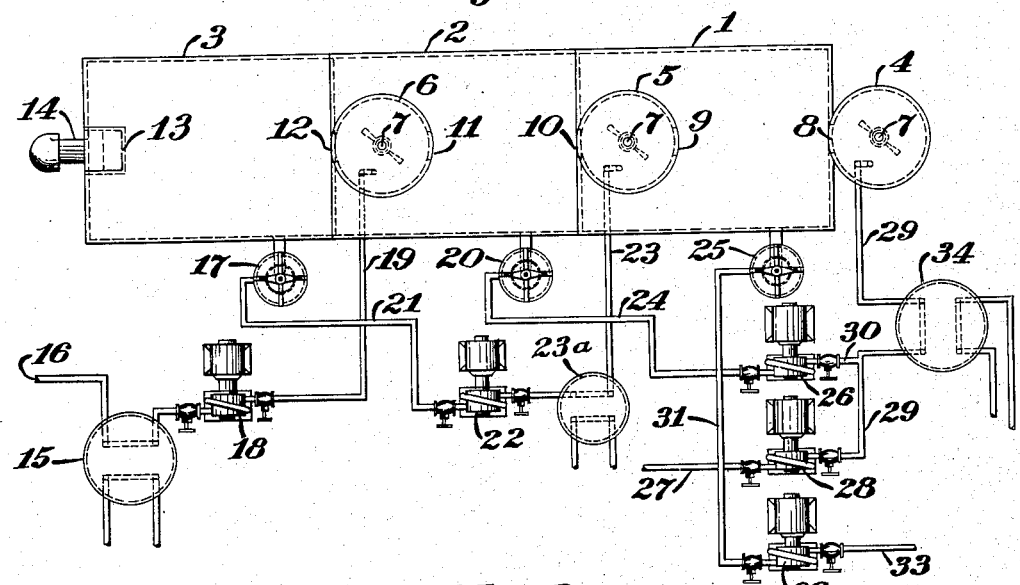
Fig.2
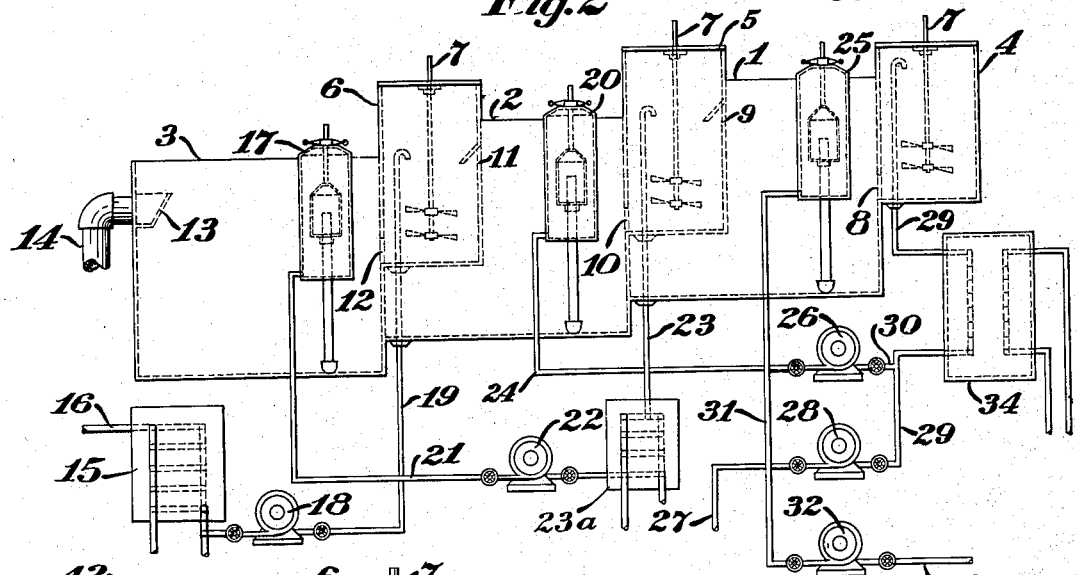
Fig.3
Inventor
Willard F. Houghton
By T. Wallace Quinn
his Attorney Patented June 22, 1937

2,084,342

UNITED STATES PATENT OFFICE 2,084,342

TREATMENT OF HYDROCARBON OILS

Willard F. Houghton, Swarthmore, Pa., assignor to The Atlantic Refining Company, Philadelphia, Pa., a corporation of Pennsylvania Application May 25, 1933, Serial No. 672,786

2 Claims. (Cl. 196—13)

The present invention relates to a process and apparatus for obtaining continuous countercurrent contact between two at least partially immiscible liquids, and particularly to the extraction of components from mineral oils with a solvent which will selectively dissolve such components. This invention is particularly applicable to the solvent extraction of mineral oils containing considerable quantities of normally solid hydrocarbon compounds or waxes, as well as being adapted to the extraction of non-wax-bearing oils.

In carrying out my process, the two fluids, viz., the selective solvent and the mineral oil to be extracted, are brought together in countercurrent flow and intimately mixed. The mixture is then allowed to settle, and the separated products, i. e., the undissolved oil and the extract, are continuously withdrawn from the system.

It has been found that the best results are obtained when a plurality of units are provided for mixing the fluids and thereafter separating them, in combination with means for effecting the flow of fluids in countercurrent relation from one unit to another, and at the same time controlling the flow with a minimum amount of regulation. For example, alternate mixing and settling chambers may be provided as a single structure, said structure being suitably partitioned to form a compact series of extraction stages, or the structure may comprise a series of individual mixing and settling chambers suitably spaced one from another and connected by means adapted to maintain countercurrent flow.

Apparatus of the preferred construction comprises a tank divided by partitions into a series of alternate mixing and settling chambers adapted to permit the oil being extracted to flow therethrough. The mixing tanks discharge into their respective settling tanks by gravity flow thru an orifice, while the settling tanks discharge into their next adjacent mixing tanks by gravity flow across weirs. The liquid level in the settling chamber is governed by the height of the overflow weir at the point of discharge into the succeeding mixing tank. By providing common double walls between the various tanks, the equipment is rendered extremely compact and the heat radiating surface of the apparatus is decreased so that a minimum amount of insulation is necessary to maintain the desired temperature in the equipment. Means are provided to regulate the withdrawal of liquid from the bottom of each of the settling tanks at a predetermined rate, and to maintain the interface between the undissolved oil and the solvent at a desired level within limits. The level of the interface between the two liquid layers is regulated by providing at the bottom of the settling tank, a drawoff consisting of a substantially vertical pipe, from the upper end of which the solvent is discharged. By regulating the height of the discharge and of the pipe, the level of the interface between the two liquids is controlled since the interface level rises or falls until equilibrium is established, and then remains constant until other changes are made in the height of the discharge pipe, or changes occur in the composition of the liquid mixture.

The regulation of the height of the discharge pipe may be accomplished in various ways, such as a swing joint which permits moving it to or from the vertical position; a flexible end which may be bent to give the desired level; or preferably, it may discharge into an overflow vessel thru the bottom of which the pipe extends by means of a liquid-tight slip joint which permits vertical motion of the vessel, so that liquid discharging from the pipe fills the vessel and overflows into a second vessel from which it is conducted by a pump to the succeeding mixing tank or other point of disposal. The height of the overflow vessel and the interface level may be varied by moving the former vertically on the drawoff pipe, e. g., by supporting it from an operating spindle which passes thru a threaded yolk and is provided with an adjusting wheel. With this arrangement, the pump cannot remove liquid at a faster rate than desired, and by setting the pump to withdraw a somewhat greater quantity of liquid than actually overflows, its complete removal is assured so that the regulation necessary is reduced to the minimum. The apparatus has the advantage that the operation may be easily regulated since the flow of liquid being extracted is entirely by gravity and since the system of regulating the withdrawal of solvent prevents its removal at a faster rate than that at which it is supplied, and insures its circulation at a predetermined rate.

In place of a single tank divided into compartments by means of partitions, a plurality of tanks may be set up in series, with a layer of insulating material between adjacent walls of adjoining tanks to permit maintenance of different temperatures in the several tanks. When separate tanks are employed, it is preferred that the overflow weir of the settling chamber discharge onto a chute leading to the next mixing tank; pipes are usually undesirable for conducting liquid from the settling tanks, since in certain types of oil, the content of paraffin wax is sufficient to form a curdy mass which flows with difficulty thru a pipe. However, when used for extracting liquids relatively free of solid or semi-solid material, pipes are satisfactory for this purpose. Furthermore, when separate mixing and separating tanks are employed, the liquid mixture issuing from the mixing tanks may be conveyed to the respective settling tanks by means of pumps, in place of the gravity flow described herein, by way of illustration.

For purposes of illustration, reference is made to the accompanying drawing in which:

Fig 1 shows a top view of a preferred arrangement of my extraction system;

Fig. 2 represents a side view of the same; and

Fig. 3 shows, in simplest form, a sectional end view of my interface level regulator and settler.

In Fig. 2 there is shown a double walled closed tank, partitioned off into alternate settling tanks (1, 2, and 3), and mixing tanks (4, 5, and 6). The settling tanks are of rectilinear construction, and are in step-like arrangement; the intermediate mixing tanks are of double walled cylindrical construction, and centrally located upon the settling tank partitions. The settling tanks are provided with overflow weirs (9, 11, and 13), and interface level regulators and solvent draw-offs (17, 20, and 25), while the mixing tanks are equipped with paddle stirrers (7) or other suitable mixing devices, discharge orifices (8, 10, and 12) and solvent supply pipes (19, 23, and 29). A system of low pressure pumps and feed pipes is so arranged as to maintain a regulated counter-current flow thru the extraction stages.

In the operation of my process, I may choose, for example, nitrobenzene as the selective solvent and a wax-containing mineral oil as the stock to be selectively extracted. The oil stock supplied from a storage tank (not shown) flows thru pipe 27, pump 28, pipe 29, and chilling device 34 into the top of mixing tank 4. The selective solvent, i. e., nitrobenzene, is conducted from a supply tank (not shown) thru pipe 16, heat exchanger 15, pump 18 and pipe 19 into the top of mixing tank 6. After sufficient oil and solvent has been supplied to the system, a continuous countercurrent flow will be set up, and the extraction process will commence to function. The oil stock charged to mixing tank 4, together with the partially used solvent from the bottom of settler 2, flowing thru regulator 20, pipe 24, pump 26, and pipe 30 into feed pipe 29, thru chilling device 34, pipe 29 and into the top of mixing tank 4, said oil and solvent are thoroughly contacted by the stirrer 7, and the mixture flows by gravity, from the bottom of mixer 4 thru orifice 8 into settling chamber 1. In chamber 1 a separation of undissolved oil and solvent containing dissolved oil is effected by the difference in gravity, the undissolved oil comprising the upper layer and the solvent the lower layer. The spent solvent, having passed thru 3 extraction stages, is withdrawn from the bottom of settler 1 thru regulator 25, pipe 31, pump 32, and pipe 33 into storage, prior to the separation of solvent from dissolved oil, as by vacuum distillation. The undissolved oil fraction containing substantially all the wax and a small quantity of solvent, occupies the upper portion of settler 1, and flows by gravity, over the weir 9 into the succeeding mixing tank 5, into which is simultaneously delivered relatively fresh solvent from the bottom of settler 3, thru regulator 17, pipe 21, pump 22, heat exchanger 23a, and pipe 23. The oil and solvent are herein again contacted thoroughly by stirrer 7, and flow thru the orifice 10 at the bottom of the mixer, into settler 2 where the separation of undissolved oil and solvent layers is effected. The solvent from the bottom of settler 2 is withdrawn thru regulator 20, pipe 24, pump 26, and pipe 30 into oil feed pipe 29, and thereafter thru chilling device 34 into mixing tank 4 to effect further extraction. The undissolved oil layer and wax rising to the top of settler 2 flow over weir 11 into mixing tank 6 where fresh solvent is introduced from storage supply thru pipe 16, heat exchanger 15, pump 18 and pipe 19. The contacting process is again effected in mixing tank 6, the mixture flowing thru orifice 12 into settler 3, the separation of layers is accomplished by settling, and the solvent is continuously withdrawn from the bottom of the settler. The undissolved oil and wax flow over the weir 13 and are removed thru pipe 14 to storage prior to the recovery of the solvent or other treatment. In the event that the oil stock being extracted contains relatively large quantities of wax, of the order of 30% or 40% of the volume of oil, an arrangement of mechanical scrapers (not shown) may be constructed in the upper end of the settling tanks, whereby such apparatus facilitates the flow of the oil-wax mixture over the weir and into the succeeding mixing tank. When a series of individual settlers and mixers is used and the chambers are connected by means of chutes, the same surface scraping apparatus may be satisfactorily used.

Under certain conditions, it may be desirable to maintain the various mixing and settling tanks at different temperatures. This may be effected by installing heating or cooling coils (not shown) in the respective tanks. In the case of the single, partitioned chamber type of construction, the double walled partitions separating the stages affords sufficient insulation to prevent serious radiation losses. The type of extraction apparatus comprising a series of individual mixing and settling tanks may likewise be provided with suitable insulation and means for heating or cooling as described above. With either type of construction, the system can, with slight modifications, handle very volatile solvents, i. e., at pressures substantially above atmospheric.

Fig. 3 shows a sectional end view of the mixing and settling chambers, and more particularly the details of the interface level regulator. The settling tank 2 contains a mixture of solvent and oil which was introduced from the preceding mixing tank thru an orifice corresponding to orifice 10 (see Fig. 2) near the center of the tank wall. The solvent and undissolved oil layers separate by difference in gravity, the former settling to the bottom, and the latter rising to the upper portion of the chamber. The undissolved oil layer, upon reaching a liquid level 35, flows by gravity over the weir 11 into the succeeding mixing tank 6 where further mixing with more solvent is effected by means of stirrer 7, and this mixture is continuously discharged thru orifice 12 into the next settling tank.

For purposes of illustration, the interface level between the oil and solvent layer is shown at 44, approximately at half the depth of the settling tank. Under pressure of the total head (level 35) the solvent which is substantially free of undissolved or entrained oil flows thru the pipe 36, filling the vessel 38, and spills over the upper edge of same into the receiver or collecting compartment 37 from which it is withdrawn by pump thru pipe 45. The vessel 38 functions as an adjustable extension of pipe 36, a liquid-tight slip joint being made at 43 which permits of raising or lowering the vessel 38, which is suspended by strap 39, threaded rod 42 and adjusting wheel 41. The rod 42 passes thru and is supported by yolk 40 at the top of collecting compartment 37. In operation, the pump which withdraws the solvent from the bottom of collecting compartment 37 thru pipe 45, is operated at a somewhat greater capacity than is necessary in order to insure complete removal of the overflow from collecting compartment 38. The construction of vessel 37 is such that any siphoning action is prevented, inasmuch as the liquid level in 37 is never allowed to reach the upper edge of vessel 38.

The regulation of the position of the interface level with regard to the settling tank is effected by changing the height of the U-tube drawoff. A relatively small change in height of the drawoff tube will cause a great difference in the position of the interface level, due to the difference in specific gravity between the solvent and the undissolved oil. For example, assuming the gravity of the solvent to be 1.2, and the undissolved oil 0.9; when the head of liquid in the settling tank is maintained constant at a total depth of 11.66 ft., and the vertical length of the drawoff tube at 10 ft., I find that the interface level is 5 ft. from the bottom of the tank. If the drawoff tube is lowered from 10 ft. to a height of 9.5 ft., a shortening of 0.5 ft., the interface level is found to be 3.0 ft. from tank bottom, and if the tube is shortened from 10 ft. to 9 ft. the interface is found to be 1.0 ft. from tank bottom. With a constant total head and gravities as given, a change of 0.1 ft. in raising or lowering the drawoff tube will cause the interface level to rise or fall 0.4 ft.

The particular advantage of this device is the ability to maintain the interface level at any desired height in the settling tank, regardless of the change in composition of the mixture of oil and solvent entering the settler, by merely adjusting the height of the drawoff tube. At the same time this regulator controls the quantity of liquid available for the pumps to withdraw from the settler and reduces pump and flow regulation to a minimum. This type of drawoff eliminates the necessity of the float control for pump regulation, said float control being particularly undesirable when operating where there is a liquid interface.

It will be appreciated by those skilled in the art, that my invention affords several marked advantages over extraction processes of the prior art, particularly (1)—gravity flow of undissolved oil, i. e., wax-bearing oil, from the settler to the succeeding mixer, thereby avoiding the necessity for special pumps to handle very waxy oils; (2)—replacing of pipes by weirs or chutes to direct or convey the undissolved oil from the settler into the succeeding mixer; (3)—means for regulating the rate of withdrawal of solvent from the bottom of the settler, and the control of the position of the interface level by a simple regulator thus reducing the adjustment of pumps to a minimum, as well as eliminating undesirable float controls for pumping; (4)—compactness of the multi-stage extraction system as herein described, and its ability to handle very waxy stocks as readily as wax-free stocks.

While I have described my invention with reference to a three-stage continuous countercurrent system, I do not intend to limit myself to any particular number of stages. My invention comprehends a system comprising one or more stages. Furthermore, the ratio of solvent to oil stock and the temperatures of contacting and settling will be governed entirely by the character of the oil to be treated, the solvent employed in the treatment, and the quality of the product desired.

My process may be illustrated by the following example:

A Barber's Hill distillate having a Saybolt Universal viscosity at 210° F. of 304 seconds, an A. P. I. gravity at 60° F. of 17.5°, flash of 575° F., fire test of 670° F., and pour test of 50° F., was treated in a five stage continuous countercurrent extraction apparatus with 183% of nitrobenzene. The temperatures maintained in the settling chambers were as follows: 1st stage 68° F., 2nd stage 79° F., 3rd stage 90° F., 4th stage 100° F., and 5th stage 113° F. The upper layer of oil from the 5th stage settler and the lower layer of nitrobenzene and oil dissolved therein from the bottom of the 1st stage settler were each distilled under vacuum to remove the solvent. The oil functions recovered had the following properties: The undissolved oil fraction comprising 39.9% of the stock had a Saybolt universal viscosity at 210° F., of 136 seconds, an A. P. I. gravity at 60° F., of 26.4°, flash of 570° F., fire test of 650° F., and pour test of 60° F. The dissolved oil fraction comprising 60.1% of the stock had a Saybolt universal viscosity at 210° F., of 754 seconds, an A. P. I. gravity at 60° F., of 12.1°, flash of 560° F., fire test of 660° F., and a pour test of 65° F.

What I claim is:

1. In an apparatus for the continuous countercurrent extraction of a hydrocarbon oil with a solvent which is at least partially immiscible therewith, the combination of a closed chamber divided into a plurality of alternate mixing and settling compartments by partitions, said compartments being in step-like arrangement, at least one of the mixing compartments being provided with stirring means and an orifice outlet to the mid-section of the succeeding settling compartment, each settling compartment having an overflow weir in the upper part and means for drawing off liquid from the lower part thereof and for passing liquid so withdrawn to a preceding mixing compartment.

2. In an apparatus for the continuous countercurrent extraction of a hydrocarbon oil with a solvent which is at least partially immiscible therewith, the combination of a closed chamber, divided into a plurality of alternate mixing and settling compartments by double-walled partitions, said compartments being in step-like arrangement, the mixing compartments being provided with stirring means and an orifice outlet to the mid-section of the succeeding settling compartment, each settling compartment being provided, in the upper part, with an overflow weir to the succeeding mixing compartment, and in the lower part with an adjustable level drawoff provided with a receiver in non-siphoning relationship to said drawoff, means for withdrawing liquid from said receiver and passing said liquid into a preceding mixing compartment.

WILLARD F. HOUGHTON.